(12) United States Patent
Chaperon et al.

(10) Patent No.: US 8,725,314 B2
(45) Date of Patent: May 13, 2014

(54) METHOD OF SYNCHRONIZED CONTROL OF ELECTRIC MOTORS OF A REMOTE-CONTROLLED ROTARY WING DRONE SUCH AS A QUADRICOPTER

(75) Inventors: Cedric Chaperon, Paris (FR); Eline Pierre, Amouville-les-Gonesse (FR)

(73) Assignee: Parrot, Paris (FR)

( * ) Notice: Subject to any disclaimer, the term of this patent is extended or adjusted under 35 U.S.C. 154(b) by 188 days.

(21) Appl. No.: 13/118,367

(22) Filed: May 27, 2011

(65) Prior Publication Data

US 2011/0301787 A1    Dec. 8, 2011

(30) Foreign Application Priority Data

Jun. 2, 2010   (FR) ...................... 10 54316

(51) Int. Cl.
*B64D 31/02*    (2006.01)
*H02P 5/46*    (2006.01)

(52) U.S. Cl.
USPC ............................................... 701/2

(58) Field of Classification Search
CPC ............ H02P 5/68; H02P 5/74; A63H 27/12; B64C 39/024; B64C 2201/027; B64C 2201/042; B64C 2201/108; B64D 27/24; B64D 31/00; Y02T 50/44; Y02T 50/62
See application file for complete search history.

(56) References Cited

U.S. PATENT DOCUMENTS

| | | | | |
|---|---|---|---|---|
| 4,568,866 A | * | 2/1986 | Floro et al. | .................... 318/696 |
| 5,420,485 A | * | 5/1995 | Campbell, Jr. | ................. 318/34 |
| 5,422,826 A | * | 6/1995 | Cousineau | .................... 700/287 |
| 6,654,648 B2 | * | 11/2003 | Nada et al. | ...................... 700/19 |
| 2007/0040529 A1 | * | 2/2007 | Takebayashi et al. | ........ 318/685 |

OTHER PUBLICATIONS

"Multicopter Table", Multicopter Wiki, Multicopter Encyclopedia, Feb. 14, 2010, XP002635969, http://multicopter.org/wiki/Multicopter_Table.
"Mikrokopter", Multicopter Wiki, Multicopter Encyclopedia, Aug. 24, 2010, XP002635970, http://multicopter.org/wiki/Mikrokopter.
"en/Microkopter", Wiki: Mikrokopter.de, Mar. 30, 2011, XP002635971, Extrait de l' Internet: URL: http://www.mikrokopter.de/ucwiki/en/Mikrokopter.
"Hexacopter", YouTube, Oct. 14, 2010, XP002635972, Extrait de l' Internet; http://www.youtube.com/watch?v=fyYujjP5J-k&feature=mfu_in order&list=UL.

* cited by examiner

*Primary Examiner* — Helal A Algahaim
*Assistant Examiner* — Charles J Han
(74) *Attorney, Agent, or Firm* — Haverstock & Owens LLP

(57) ABSTRACT

Each motor is controlled by a microcontroller and the set of microcontrollers is driven by a central controller. According to the invention, said method comprises: a preliminary step consisting at least in establishing an asynchronous serial communications link over a line between the central controller and each of the microcontrollers, and in allocating an address parameter to each microcontroller; and in operation, at least a control step proper consisting: i) for the central controller, in sending simultaneously on each link line a message containing at least one instruction specified by the address parameter of a destination microcontroller that is to execute said instruction; and ii) for each destination microcontroller, in extracting the instruction addressed thereto from said message, and executing it.

15 Claims, 2 Drawing Sheets

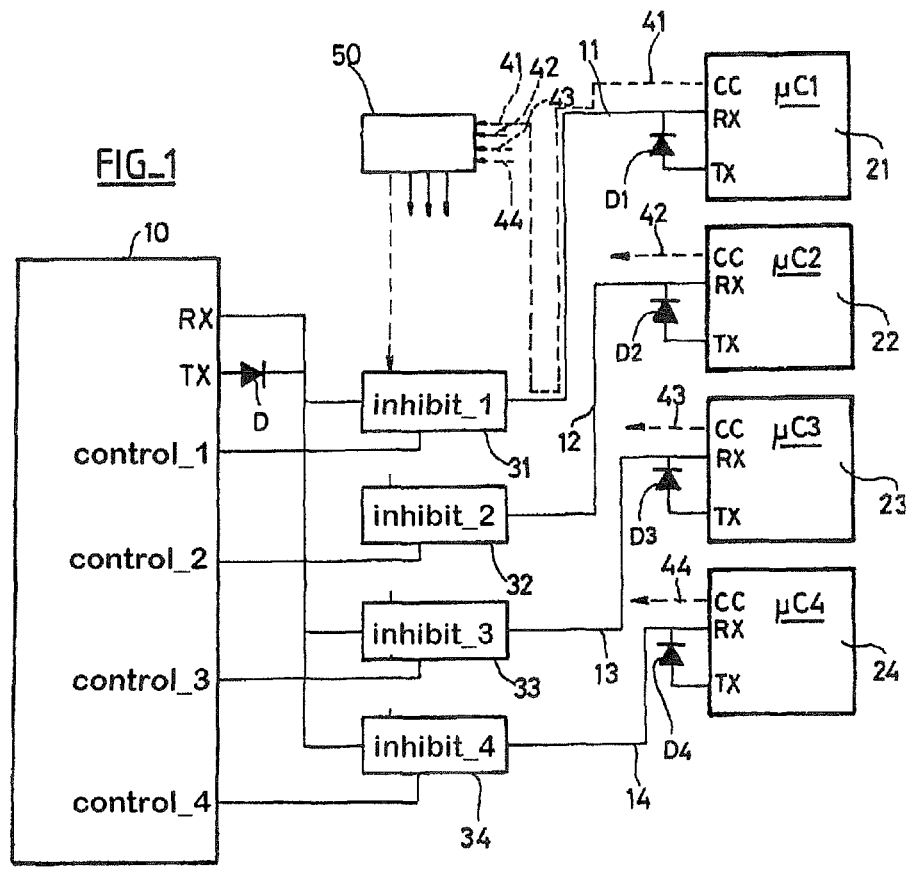
FIG_1
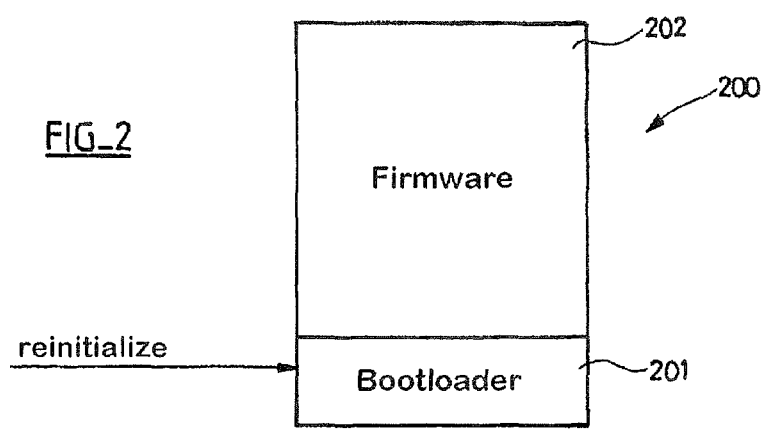
FIG_2

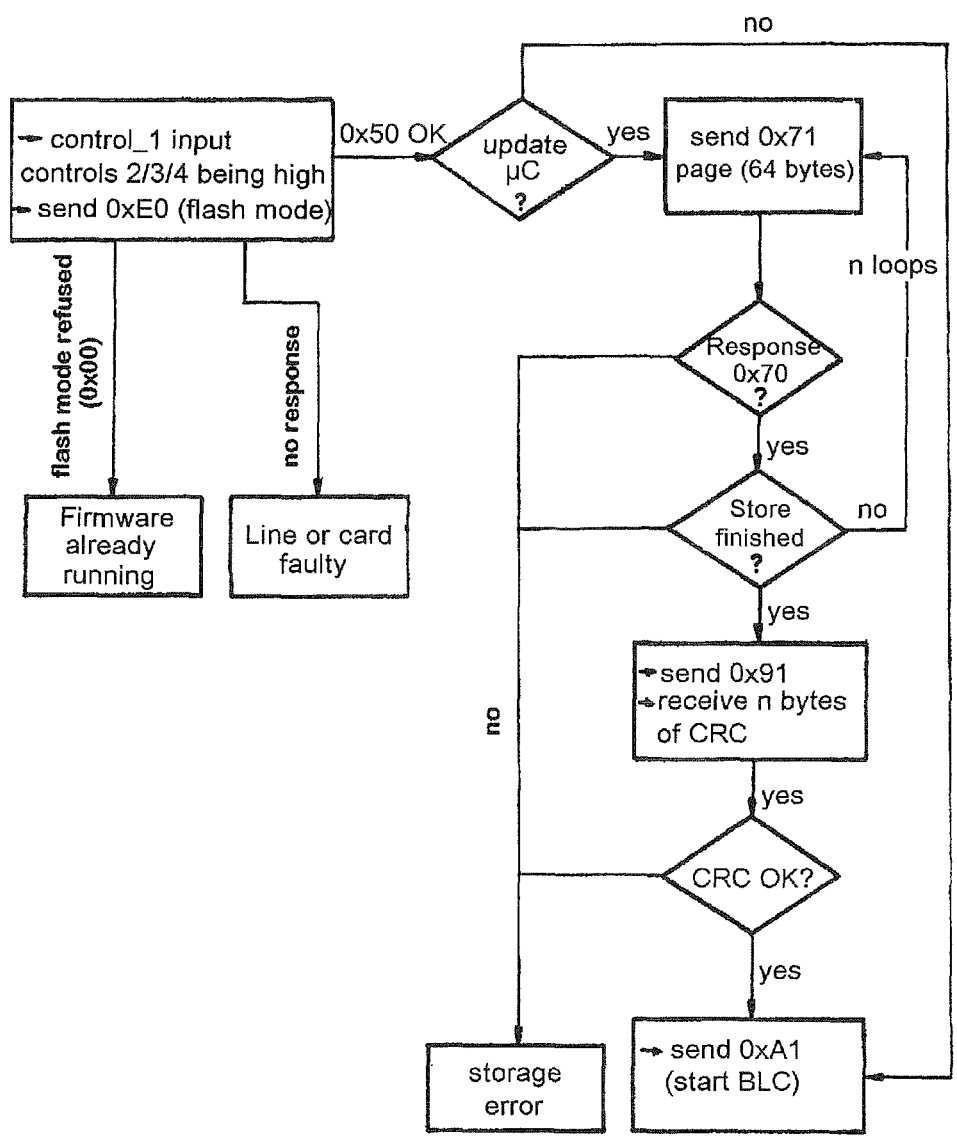
FIG_3

METHOD OF SYNCHRONIZED CONTROL OF ELECTRIC MOTORS OF A REMOTE-CONTROLLED ROTARY WING DRONE SUCH AS A QUADRICOPTER

FIELD OF THE INVENTION

The present invention relates to a method of synchronized control of a plurality of electric motors, for a remote-controlled rotary wing drone such as a quadricopter.

BACKGROUND OF THE INVENTION

The term "rotary wing drone" is used herein to designate any known helicopter configuration having a plurality of motors, and in particular the twin rotor tandem or "banana" configuration, the Kamof configuration with contrarotating coaxial rotors, and most particularly the quadricopter or quadrirotor configuration having four fixed-pitch coplanar rotors having respective motors that are driven independently by an incorporated navigation and attitude control system.

A typical example of such a drone is the AR Drone from Parrot S A, Paris, France, which is a quadricopter fitted with a series of sensors (accelerometers and gyros on three axes, altimeter, vertically-aimed camera) together with a system for automatically stabilizing hovering flight on the principle described in WO 2009/109711 (Parrot). The drone also has a forward-facing camera for picking up an image of the scene to which the drone is going.

In such a quadricopter type drone, the rotary wing is constituted by four propulsion units each comprising a propeller driven by an electric motor via a system for reducing the generally very high speed of rotation of the motor. The drive motor in each propulsion unit is controlled by its own microcontroller, which is in turn driven as a function of flight parameters by a single central controller that is common to all of the propulsion units.

It can be understood that the flying quality of a drone having a plurality of propulsion units depends to a very large extent on the accuracy with which the microcontrollers that control the motors of the propulsion units are themselves driven by the central controller. The central controller is responsible for converting flying action set by the user into terms of drive signals for application to the microcontrollers of the motors.

Furthermore, it is essential for the commands that are applied to the motors to be executed perfectly synchronously, since it is not sufficient to give the microcontrollers appropriate drive signals, it is also necessary for those signals to reach them synchronously, given that the smallest time differences between those signals can lead to instabilities in the behavior of the drone.

One known method of controlling quadricopter type drones makes use of pulse-width modulation (PWM), which consists in modulating the width of a pulse for sending a corresponding setpoint to the microcontrollers of the motors. The advantage of that technique is that it can be applied to various types of motor, e.g. motors with or without brushes. Nevertheless, it cannot guarantee that the control of the motors is accurately synchronized between them.

Thus, an object of the present invention is to propose a method of synchronized control of a plurality of electric motors, each motor being controlled by a microcontroller and the set of microcontrollers being driven by a central controller, which method makes it possible under all circumstances to achieve perfect synchronization in the commands applied by the motors.

In accordance with the invention, this object is achieved by the fact that the method comprises:
a preliminary step consisting at least in establishing an asynchronous serial communications link over a line between the central controller and each of the microcontrollers, and in allocating an address parameter to each microcontroller; and
in operation, at least a control step proper consisting:
for the central controller, in sending simultaneously on each link line a message containing at least one instruction specified by the address parameter of a destination microcontroller that is to execute said instruction; and
for each destination microcontroller, in extracting the instruction addressed thereto from said message, and executing it.

Thus, with a quadricopter type drone, for example, when the central controller needs to send to each of the four microcontrollers an instruction concerning the drive of the associated motor, it prepares a single message containing the four instructions each allocated to the address parameter of the corresponding microcontroller, and it sends that message simultaneously to all four microcontrollers on the four asynchronous serial communications lines. On reception, each microcontroller acts simultaneously to use the address parameter to extract from the message the instruction for that microcontroller and to drive the corresponding motor accordingly. In this way, control of all four motors is rigorously synchronized.

By way of example, said instruction is a speed setpoint value for application to each motor. This is naturally an instruction of major importance, since it governs how the drone flies. The messages concerning this speed instruction are transmitted with a periodicity of a few milliseconds.

Furthermore, the invention also provides for said instruction to be a command for controlling equipment associated with the motors. This provision presents the advantage that the equipment in question is driven without having recourse to additional link cables between the central controller placed in the main structure of the drone and the microcontrollers that are situated together with the associated motors at the ends of four arms projecting from the main structure. This avoids making the arms of the drone unnecessarily heavy.

Amongst the kinds of equipment that are envisaged, mention may be made of light-emitting diodes (LEDs) of different colors that may be driven by the central controller.

In order to enable information to be returned from the microcontrollers to the central controller, the invention provides for said instruction to be a request for data relating to the operation of the motors.

For example, if the central controller seeks to discover the speed of a motor, it may use the asynchronous serial link lines to send a message containing a speed request instruction specifying the address parameter of the microcontroller associated with the motor in question. On reception, only the destination microcontroller transmits a response message to the request by delivering the requested speed over the communications line. The other microcontrollers ignore the request message, since their own address parameters were not specified therein.

According to the invention, the preliminary step also consists in interposing an inhibit block on each link line for inhibiting communication on said line, said inhibit block being controlled by the central controller. This particular mode of communication between the central controller and the microcontrollers makes it possible, where necessary, to address only one microcontroller at a time.

This situation arises in particular during the initialization of the process, when the microcontrollers do not yet have respective address parameters. Under such circumstances, address parameters are allocated to the microcontrollers during the preliminary step by the controller using the inhibit blocks to send an address allocation message to each microcontroller, the message containing the corresponding address parameter.

Similarly, the invention advantageously proposes that the preliminary step should also consist in using the inhibit blocks to establish in succession between the central controller and at least one of the microcontrollers a protocol for reinitializing a firmware memory of said microcontroller.

It is thus possible to update the firmware contained in each memory in selective manner so as to ensure that all of the microcontrollers contain the same version of the firmware.

To this end, the method of the invention also includes at least one request step for requesting at least data relating to the firmware memory of each microcontroller and/or the associated motor.

In particular, said data is the version number of the firmware.

In general, the request step is performed by the central controller using the inhibit blocks to send a request message to at least one microcontroller, the message specifying said data, and the central controller waiting for the response from said microcontroller before sending a new message.

Finally, the invention provides a particular so-called "cut-out" procedure for application whenever at least one motor cannot function in compliance with the instructions received, in particular the speed instruction, e.g. because the motor has just braked suddenly as a result of an article becoming caught in the propeller driven by the motor.

In the event of an engine failing, this cutout procedure consists in the associated microcontroller sending an emergency message to the central controller.

After receiving an emergency message, the central controller sends a message to the microcontrollers, said message containing a zero setpoint speed instruction for application to the motors.

In practice, the failure of a motor is detected from the value of the derivative of the motor speed, given that a sudden variation in the derivative indicates that there is an anomaly in the operation of the motor.

BRIEF DESCRIPTION OF THE DRAWINGS

There follows a description of an embodiment of the device of the invention given with reference to the accompanying drawings in which the same numerical references are used from one figure to another to designate elements that are identical or functionally similar.

FIG. 1 is a diagram of an asynchronous serial link between a central controller and four microcontrollers of a drone of the quadricopter type.

FIG. 2 is a diagram of a firmware memory of one of the FIG. 1 microcontrollers.

FIG. 3 is a flow chart showing the reinitialization of the firmware of FIG. 2.

MORE DETAILED DESCRIPTION

There follows a description of an embodiment of the device of the invention.

FIG. 1 shows an asynchronous serial link between a central controller 10 and four microcontrollers 21, 22, 23, and 24. This communications system serves in particular to provide synchronized control of four motors (not shown in FIG. 1) forming parts of four propulsive units of a rotary-wing drone of the quadricopter type.

More precisely, each motor is controlled by a respective one of the microcontrollers 21, 22, 23, and 24, and the set of microcontrollers is driven by the central controller 10 as a function of flight parameters imposed by the software for flying the drone.

The reception RX and transmission TX of messages between the central controller 10 and each of the microcontrollers 21, 22, 23, and 24 are multiplexed over a single respective universal asynchronous receiver/transmitter (UART) communications line 11, 12, 13, and 14. As shown in FIG. 1, a diode, D, $D_1$, $D_2$, $D_3$, or $D_4$ is placed between the reception terminals RX and transmission terminals TX of the main controller 10 and of each of the microcontrollers 21, 22, 23, and 24 in order to avoid receiving electric signals on the transmission terminals TX.

Furthermore, in FIG. 1 it can be seen that a respective inhibit block 31, 32, 33, and 34 is placed in each communications line 11, 12, 13, and 14. The inhibit blocks are controlled by the central controller 10 via respective outputs control_1, control_2, control_3, and control_4 so as to establish or interrupt communication over the UART lines at will. By way of example, the inhibit blocks 31, 32, 33, and 34 may be constituted by metal oxide semiconductor field-effect transistors (MOSFETs) operating as switches.

The four motors of the drone are controlled synchronously in compliance with a method that consists, in a preliminary first step prior to putting the motors into operation proper, in allocating an address parameter to each associated motor-and-microcontroller pair.

This operation is performed by the central controller 10 sending an attribution message in succession to each of the microcontrollers while appropriately controlling the inhibit blocks 31, 32, 33, and 34, the attribution message being coded on one byte, e.g. containing a header coded on three bits ('0b000') giving the instruction to which the message relates, specifically allocating an address parameter (SET_ADDRESS), followed by an address parameter that is coded on five bits. The destination microcontroller then reads from the message the address parameter that is allocated thereto and it stores this parameter in memory.

Still in the preliminary stage, it may be preferable, particularly after the system has been reset or when the motors are switched on, to obtain the current version of the firmware of each microcontroller and to ensure that the microcontrollers are indeed all fitted with the same version of the firmware.

To do this, the central controller 10 sends a message to each microcontroller while appropriately controlling the inhibit blocks 31, 32, 33, and 34, the message comprising a request asking for the version of the firmware memory of the microcontroller. The request message, encoded on one byte, contains for example a header coded on three bits (' 0b010') specifying the firmware version request instruction (GET_VERSION), followed by five padding bits. The microcontroller receiving the message then returns the requested version of its firmware memory, via the communications line.

As a general rule, when the central controller 10 sends a message that requires a response, such as a request message, it waits for the response before sending a new message. Any message collision runs the risk of putting the motors into an undetermined state.

Naturally, other data may be requested, in particular data relating to the motors themselves, such as the supplier, its reference, manufacturing batch number, etc.

If it is found that the firmware version needs to be replaced by a more recent version, then the central controller 10 engages a firmware reinitialization procedure with the microcontroller in question.

It is important to observe that this reinitialization procedure may also be imposed by the central controller with each of the microcontrollers 21, 22, 23, and 24 after a reset or when the drone is started. In this way, it is ensured that all of the microcontrollers do indeed have firmware of the same version.

In order to reinitialize a firmware memory, the central controller 10 sends a reinitialization message to the single microcontroller concerned by appropriately controlling the inhibit blocks 31, 32, 33, and 34, the reinitialization message being coded on one byte, e.g. having a header coding the reinitialization instruction (FLASH_MODE) on three bits (0b111), followed by a five-bit word ('0b00000').

As shown in FIG. 1, the reinitialization message is received in the firmware memory 200 in a bootloader zone 201 that is write-protected and that enables the firmware stored in a rewritable zone 202 to be updated by the flash storage process.

The reinitialization procedure between the central controller 10 and one of the microcontrollers, here the microcontroller 21, then takes place in accordance with FIG. 3.

The central controller 10 establishes communication with the microcontroller 21 by actuating its output control_1 and by inhibiting its outputs control_2, control_3, and control_4 using the inhibit blocks 32, 33, and 34, and it then sends an instruction '0xE0' for switching the firmware memory 200 into a store/start mode. In the absence of any response, it is deduced that the serial link or the memory is faulty. When the firmware of the card has already been launched, i.e. other than during a reset or a start, the microcontroller 21 responds in the negative with a refusal message '0x00'. Otherwise, the card indicates that it is ready to receive instructions from the central controller 10 by returning an accept message '0x50'.

If there is no need to update the firmware in the firmware memory 200, then the procedure moves on directly to the start state by sending an instruction '0xA1', to which the card 200 responds by an acknowledgment '0xA0'.

If the firmware needs to be updated, the central controller 10 then sends in a loop n successive pages of 64 bytes, each page being accompanied by a store instruction '0x71'. On receiving each page, the firmware memory 200 must respond with an acknowledgment '0x70', otherwise it is considered that there has been a storage error and the reinitialization procedure is interrupted.

Once updating has terminated, the central controller sends an instruction '0x91' requiring the cyclic redundancy check (CRC) codes for each of the stored pages to be sent. The firmware memory 200 then provides these codes, and so long as they are in compliance, the start instruction '0xA1' is sent, followed by the return of an acknowledgment '0xA0'.

To start the motors, it suffices to send them a speed setpoint value that, for example, is greater than 20% of the maximum value '511', i.e. '103' for a speed coded on nine bits. When no setpoint value has been sent for more than several tens of milliseconds (ms), e.g. 50 ms, the motor stops.

In nominal operation of the drone, the central controller 10 is naturally caused to send control messages to the microcontrollers 21, 22, 23, and 24, if only to transmit driving instructions to them as established by the central controller as a function of the navigation software of the drone.

A driving instruction of major importance relates to the speed of each motor. For this type of instruction, the central controller 10 sends simultaneously over each of the communications lines 11, 12, 13, and 14, a message is coded on five bytes containing a header coding the motor speed drive instruction (SET_VALUE), which is coded on three bits ('0b001'), followed by four speed setpoint values that are each coded on nine bits, each being associated with a respective one of the motors as a function of the address parameter as previously allocated, and a padding bit.

The four microcontrollers 21, 22, 23, and 24 receive the speed control message simultaneously, and each of them extracts therefrom the setpoint value that is associated therewith and applies it to the associated motor.

As emphasized above, this control method presents the advantage of ensuring that the control of all four motors is perfectly synchronous, which condition is essential to ensure good flight stability for the drone.

Conversely, the central controller 10 may interrogate each microcontroller 21, 22, 23, and 24 about the speed of the associated motor.

To do this, it sends a motor speed request message simultaneously over each of the communications lines 11, 12, 13, and 14. The request message coded on one byte, for example, contains a header coding the motor speed request instruction (GET_SPEED) on three bits ('0b100') followed by the five bits of the address parameter for the microcontroller in question. The central controller 10 then puts itself into a position waiting for a response to the request that it has transmitted. On reception, only the microcontroller identified in the message by its address parameter returns the requested value for the current speed of the associated motor, via the communications line.

The driving instructions may relate to equipment other than the motors of the drone, for example they may relate to LEDs located close to each motor.

Under such circumstances, the central controller 10 sends a message simultaneously over each of the communications lines 11, 12, 13, and 14, the message being coded on two bytes containing a header, for example coding the red and green LED drive instructions (SET_LED) on three bits ('0b011'), followed by four times two bits that correspond, for each microcontroller identified by its address parameter, to the on or off state of the red diode and of the green diode, together with four padding bits.

The advantage of this procedure is that it avoids installing additional control cables along the arms connecting the central controller to the motors. This results in a weight saving for the drone.

In the same manner as for the SET_VALUE instruction, the four microcontrollers 21, 22, 23, and 24 receive the diode control message simultaneously, and from it they extract the setpoints (bit=1: LED on, bit=0: LED off) that each of them is to apply to its associated red and green diodes.

Finally, a very important function for the safety of the drone relates to the "cutout" procedure that should be implemented when an anomaly occurs in the operation of one or more motors, in particular sudden braking of a motor as a result of any kind of accident, such as an article being caught in a propeller.

Each microcontroller 21, 22, 23, and 24 continuously measures the speed of the associated motor or its derivative, and it diagnoses a failure of the motor if the measured speed value is no longer in compliance with the setpoint value, or if the derivative of the speed is too great. Under such circumstances, the corresponding microcontroller listens to the communications line and, as soon as it is inactive, it sends an emergency message to the central controller 10. This message is repeated several times, such that even if the central controller were to be transmitting a control message, the number of emergency messages sent exceeds the length of the control message.

After receiving the emergency message, the central controller 10 decides to stop all of the motors in order to avoid any risk of instability and consequently it uses the SET_VALUE instruction to send a speed setpoint having a zero value to the microcontrollers. The term "zero value" is used to mean a value that is indeed zero or at least that is less than 20% (for example) of the above-defined maximum value '511', i.e. '103'.

A variant implementation of this "cutout" consists in providing each motor with an additional respective dedicated line 41, 42, 43, 44 separate from the corresponding signal line 11, 12, 13, 14 and connecting a specific output CC of each microcontroller 21, 22, 23, and 24 to a logic circuit 50 beside the central controller (a hardware circuit separate from the controller 10) that is suitable for activating the inhibit blocks 31, 32, 33, and 34 in the event of a fault being detected as represented by any one of the lines 41, 42, 43, or 44 going to the high state. Activation of the inhibit blocks prevents any speed setpoint being transmitted to the motors, and as explained above, the motors will therefore stop automatically after a few tens of milliseconds because they have not received a speed setpoint.

The drone will then drop vertically without spinning as a result of all four motors stopping almost simultaneously.

In general, the above-described solution of the invention making use of a digital setpoint over a single serial link presents numerous advantages, in particular compared with a setpoint sent in conventional manner using a PWM command. In particular:

- since all four motors receive their servo-control setpoints simultaneously, synchronization of the setpoints sent to each of the motors is very good;
- a setpoint sent in digital form over a serial link does not suffer from errors associated with analog measurement of the width of pulses, as can happen with a setpoint sent in the form of PWM;
- the digital link may be used for driving other members associated with the microcontrollers of the motors (e.g. LEDs);
- the link is bidirectional, which makes it possible to receive information from the microcontrollers of the motors, e.g. fault information in order to actuate a cutout; and
- the above two properties may be used to update the software of the microcontrollers of the motors, by interrogating the system about its firmware version and, where necessary, by sending the new version of the firmware over the same link.

Finally, and above all, the digital information sent over the serial link enables a higher level setpoint to be sent, in particular a setpoint that is explicit concerning the speeds of the motors, rather than a PWM setpoint that determines an electrical voltage. Compared with voltage control, speed control is of very great advantage insofar as:

- it makes it possible to manage dispersion in the performance of the electric motors, inherent to the manufacturing process: it is not unusual to find efficiency differences of ±10% in a batch of electric motors, so speed control makes it possible to obtain the same propeller speed with the same setpoint from all of the motors in a batch regardless of any efficiency differences; speed control thus enables motors to be installed presenting performance levels that are fairly different, including motors that come from different manufacturers;
- it also makes it possible to take account of other variations in the efficiency of a motor unit, in particular mechanical variations that result from gear friction and the fitting of shafts, which variations are compensated by using speed control, which is not the case when using voltage control;
- speed control also presents the advantage of conserving a setpoint that remains identical even when the vehicle battery is running low: when using PWM control to determine an electrical voltage with a battery voltage that is becoming lower, the current delivered by the battery also becomes lower, so the voltage control needs to be increased in order to deliver the same power; speed control overcomes this problem; and
- in general, speed control serves to improve operation over the entire control range of the motors by making control of a motor linear.

Nevertheless, using speed control instead of voltage control does give rise to a drawback.

With a speed setpoint, the upper limit of the control range, in other words the maximum speed that the engine can reach, is not known a priori. The maximum speed is associated with numerous parameters, such as the discharge state of the battery, the efficiency specific to each motor, mechanical friction, etc.

In contrast, when the motor is driven using a voltage setpoint, the upper limit is known: the microcontroller is requested at a given instant to power the motor with the maximum voltage from the battery, thereby naturally achieving the upper limit of its control range.

With a speed setpoint it is indeed possible to define a "worst case" upper limit, corresponding to the speed that can be reached by a low-efficiency motor powered by an almost-discharged battery. However that method does not enable the system to be operated at its maximum power.

Unfortunately, drone piloting algorithms need to know the upper limit of the motor control range, in particular in order to determine the conditions under which a motor will saturate, so as to avoid exceeding the corresponding setpoint value. It is also necessary to know the limit of each of the motors in order to make best use of the flight envelope, for example when the drone is descending quickly and it is desired to give maximum power to the motors in order to brake its descent.

In an improvement of the invention, it is possible to conserve speed control, while mitigating the drawback of not having a priori knowledge of the upper limit of the control range.

The solution consists in using the possibility of receiving information sent by the microcontrollers of the motors. The central controller 10 sends a GET_MAXSPEED instruction at regular intervals to each of the microcontrollers 21, 22, 23, and 24, but at a low frequency (e.g. once per second), which instruction requests an estimate of the maximum speed of the motor associated with the microcontroller.

The microcontroller then evaluates the maximum speed of the motor associated therewith by means of an internal algorithm, based on observing the voltage that is being applied to the motor in order to obtain a resultant speed that is known, and on a prediction that may be in the form of a prerecorded curve of motor characteristics (on switching on, the value may be initialized to a "worst case" value, which value can then periodically be corrected by measuring the real behavior of the motor).

The result of this evaluation is transmitted to the central controller in response to the request, such that the central controller is continuously informed about any variation in the performance of each motor throughout the flight of the drone, in particular as a function of the battery losing charge.

What is claimed is:

1. A method of synchronously controlling a plurality of electric motors for a remote-controlled rotary wing drone such as a quadricopter, each motor being controlled by a microcontroller and the set of microcontrollers being driven by a central controller, wherein each microcontroller is coupled to the central controller by a respective, specific UART serial communications link over a separate line extending between the central controller and the respective microcontroller, wherein said method comprises:

a preliminary step comprising allocating a software address parameter to each microcontroller; and in operation, at least a control step comprising:

by the central controller, sending simultaneously on each link line a message containing at least one instruction specified by the software address parameter of a destination microcontroller that is to execute said instruction; and by each destination microcontroller, extracting the instruction addressed thereto from said message, and executing it;

wherein the preliminary step of allocating a software address parameter includes, successively for each of the microcontrollers:

by the central controller:

selectively inhibiting communications on the lines between the central controller and the microcontrollers other than the destination controller; and sending to the destination microcontroller, on the line extending between the central controller and the destination microcontroller, an address allocation message including the software address parameter; and by the destination microcontroller:

receiving the address allocation message and storing the software address parameter included therein.

2. The method according to claim 1, wherein said line between the central controller and each of the microcontrollers is a multiplexed transmit/receive line.

3. The method according to claim 1, wherein said instruction is a speed setpoint value for application to each motor.

4. The method according to claim 1, wherein said instruction is a command for controlling equipment associated with the motors.

5. The method according to claim 1, wherein said instruction is a request for data relating to the operation of the motors.

6. The method according to claim 1, wherein said instruction is a request for data relating to the maximum operating speeds of the motors.

7. The method according to claim 1, wherein the inhibiting communication on the respective line between the central controller and the microcontroller includes activating an inhibit block interposed on each link line for inhibiting communication on said line, said inhibit block being controlled by the central controller.

8. The method according to claim 7, wherein the preliminary step also consists in using the inhibit blocks to establish in succession between the central controller and at least one of the microcontrollers a protocol for reinitializing a firmware memory of said microcontroller.

9. The method according to claim 7, also including at least one request step for requesting at least data relating to a firmware memory of each microcontroller and/or the associated motor.

10. The method according to claim 9, wherein said data is a firmware version number.

11. The method according to claim 9, wherein the request step is performed by the central controller using the inhibit blocks to send a request message to at least one microcontroller, the message specifying said data, and the central controller waiting for the response from said microcontroller before sending a new message.

12. The method according to claim 1, wherein, in the event of an engine failing, the associated microcontroller sends an emergency message to the central controller.

13. The method according to claim 12, wherein, after receiving an emergency message, the central controller sends a message to the microcontrollers, said message containing a zero setpoint speed instruction for application to the motors.

14. The method according to claim 12, wherein a motor failure is detected from the value of the derivative of the motor speed.

15. The method according to claim 1, wherein the selectively inhibiting communications on the lines between the central controller and the microcontrollers other than the destination controller comprises actively inhibiting communications on the lines.

* * * * *